(12) United States Patent
Chen et al.

(10) Patent No.: US 8,410,358 B2
(45) Date of Patent: Apr. 2, 2013

(54) ELECTRONIC DEVICE ENCLOSURE

(75) Inventors: Yun-Lung Chen, Taipei Hsien (TW); Ling-Xin Zeng, Shenzhen (CN); Jun-Pu Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 359 days.

(21) Appl. No.: 12/882,598

(22) Filed: Sep. 15, 2010

(65) Prior Publication Data

US 2011/0297414 A1 Dec. 8, 2011

(30) Foreign Application Priority Data

Jun. 4, 2010 (CN) .......................... 2010 1 0191584

(51) Int. Cl.
*H05K 5/00* (2006.01)
(52) U.S. Cl. ......................... 174/50; 361/726
(58) Field of Classification Search ................... 361/726
See application file for complete search history.

(56) References Cited

U.S. PATENT DOCUMENTS

| | | | | |
|---|---|---|---|---|
| 6,608,766 B2 * | 8/2003 | Wortman et al. | ............. | 361/818 |
| 6,730,842 B2 * | 5/2004 | Woolsey | .......................... | 174/50 |
| 7,166,799 B2 * | 1/2007 | Chen et al. | ...................... | 174/50 |
| 8,247,690 B2 * | 8/2012 | Wang et al. | ..................... | 174/50 |
| 2003/0030972 A1 * | 2/2003 | Laio | .............................. | 361/681 |
| 2005/0185424 A1 * | 8/2005 | Tsai et al. | ..................... | 362/632 |
| 2008/0239646 A1 * | 10/2008 | Chen et al. | .................... | 361/683 |

\* cited by examiner

*Primary Examiner* — Anatoly Vortman
*Assistant Examiner* — Jacob Crum
(74) *Attorney, Agent, or Firm* — Altis Law Group, Inc.

(57) ABSTRACT

An electronic device enclosure includes an enclosure body, a bezel, a resilient locking clip, and an unlocking clip. An opening is defined in the enclosure body. The bezel assembly is mounted to the enclosure body and covers the opening. The resilient locking clip is attached to the enclosure body. A protrusion is located on the resilient clip. The unlocking clip is attached to the bezel assembly and is operable along a first direction. The unlocking clip is capable of being rotated from a first position to a second position. In the first position, the resilient locking clip blocks the bezel assembly from moving along the first direction. In the second position, the resilient clip is disengaged from the bezel by the unlocking clip.

18 Claims, 5 Drawing Sheets

ELECTRONIC DEVICE ENCLOSURE

BACKGROUND

1. Technical Field

The present disclosure relates to electronic device enclosures, especially to an electronic device enclosure with a detachable bezel.

2. Description of Related Art

A typical bezel is mounted to a chassis by means of a number of set screws or fasteners attached to the bezel and engaged in a number of fixing holes defined in the computer case. Two sidewalls of the chassis define a number of receiving slots. Side edges of the bezel have a number of barbs engaging in corresponding slots of the chassis, thereby connecting the front bezel to the chassis. However, this mounting assembly requires the bezel to have numerous barbs to secure the bezel, which makes the detachment of the bezel from the chassis inconvenient and laborious.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
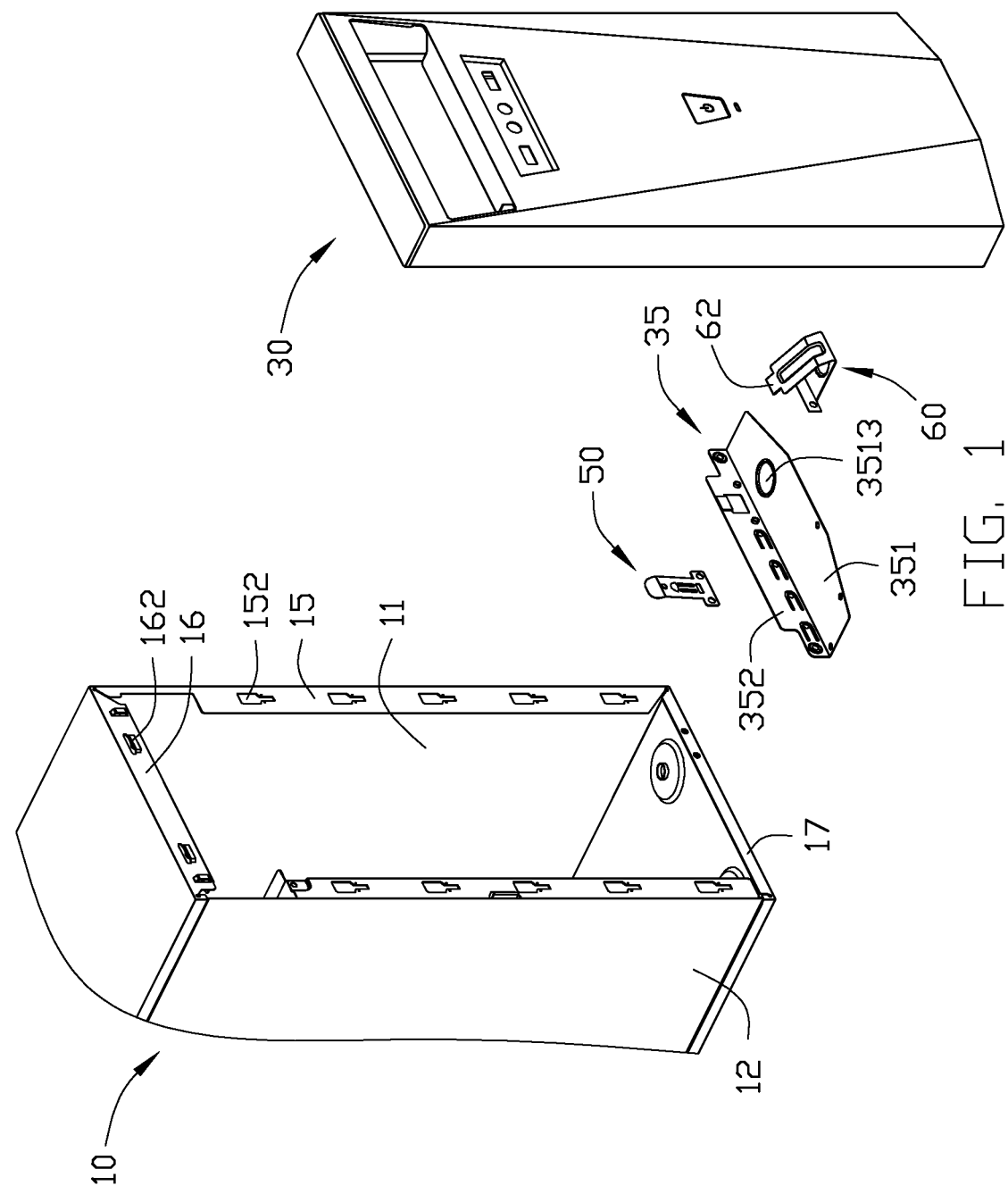
FIG. 1 is an exploded, isometric view of an embodiment of an electronic device enclosure.
Figure 2:
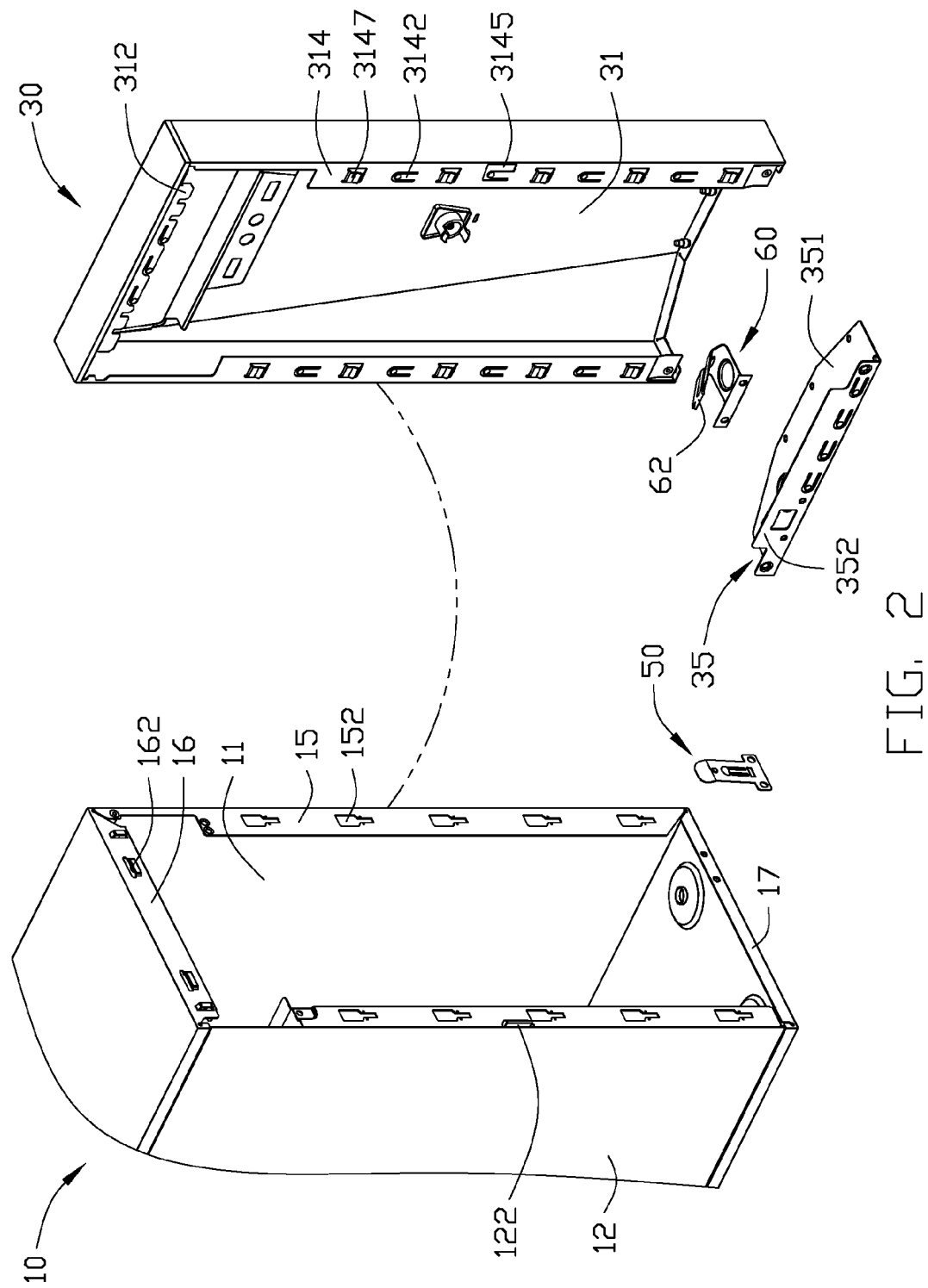
FIG. 2 is similar to FIG. 1, and shows another aspect of a bezel assembly.

Referring to FIG. 1 and FIG. 2, one embodiment of an electronic device enclosure includes an enclosure body 10, a bezel assembly, a locking clip 50 and an unlocking clip 60. The bezel assembly includes a bezel 30 and a bottom cover 35. An opening is defined in the enclosure body 10, and the bezel assembly is attached to cover the opening.

The enclosure body 10 includes a chassis 11 and a side panel 12 detachably mounted to the chassis 11. The chassis 11 includes two opposite side flanges 15, a top flange 16 and a bottom flange 17. A number of vertically arranged and evenly spaced T-shaped retaining holes 152 are defined in each side flange 15. Two horizontally arranged bridges 162 are located on the top flange 16. A mounting tab 122 protrudes from a front side of the side panel 12.

The bezel 30 and the bottom cover 35 are made of metal. The bezel 30 includes a main body 31 and two opposite inner edges 314. A number of vertically arranged and evenly spaced latches 3147 is located on each inner edge 314 corresponding to the T-shaped retaining holes 152 of the chassis 11. A number of elastic fingers 3142 are located on each inner edge 314 for connecting the side flanges 15. A mounting hole 3145 is defined in one of the inner edges 314 corresponding to the mounting tab 122 of the side panel 12. Two tongues 312 extend downward from the main body 31 corresponding to the bridges 162 of the chassis 11.

The bottom cover 35 can be fixed to a bottom portion of the bezel 30 and includes a bottom wall 351 and a side wall 352. An operating hole 3513 is defined in the bottom wall 351.

Figure 3:
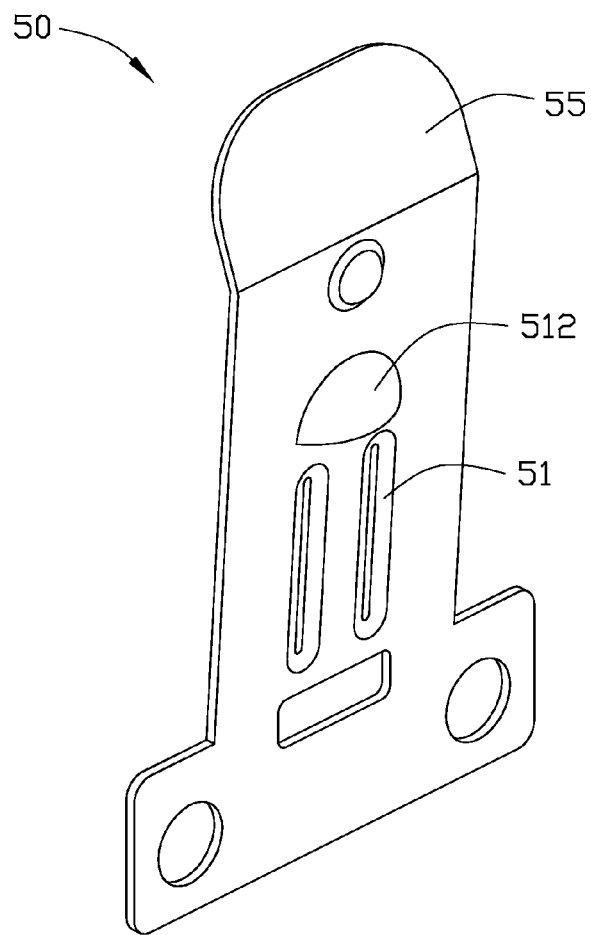
FIG. 3 is an enlarged view of a locking clip of FIG. 1.

Referring to FIG. 3, the locking clip 50 can be mounted to the bottom flange 17 of the chassis 11. The locking clip 50 includes a base 51 and a bevel 55. The base 51 is distortable. A semi-spherical protrusion 512 is located on the base 51 for blocking the bezel assembly. The bevel 55 is oblique relative to the base 51 for guiding the bezel assembly.

The unlocking clip 60 is V-shaped. One end of the unlocking clip 60 can be mounted to the side wall 352 of the bottom cover 35. The unlocking clip 60 includes a free end portion 62 for impelling the locking clip 50.

Figure 4:
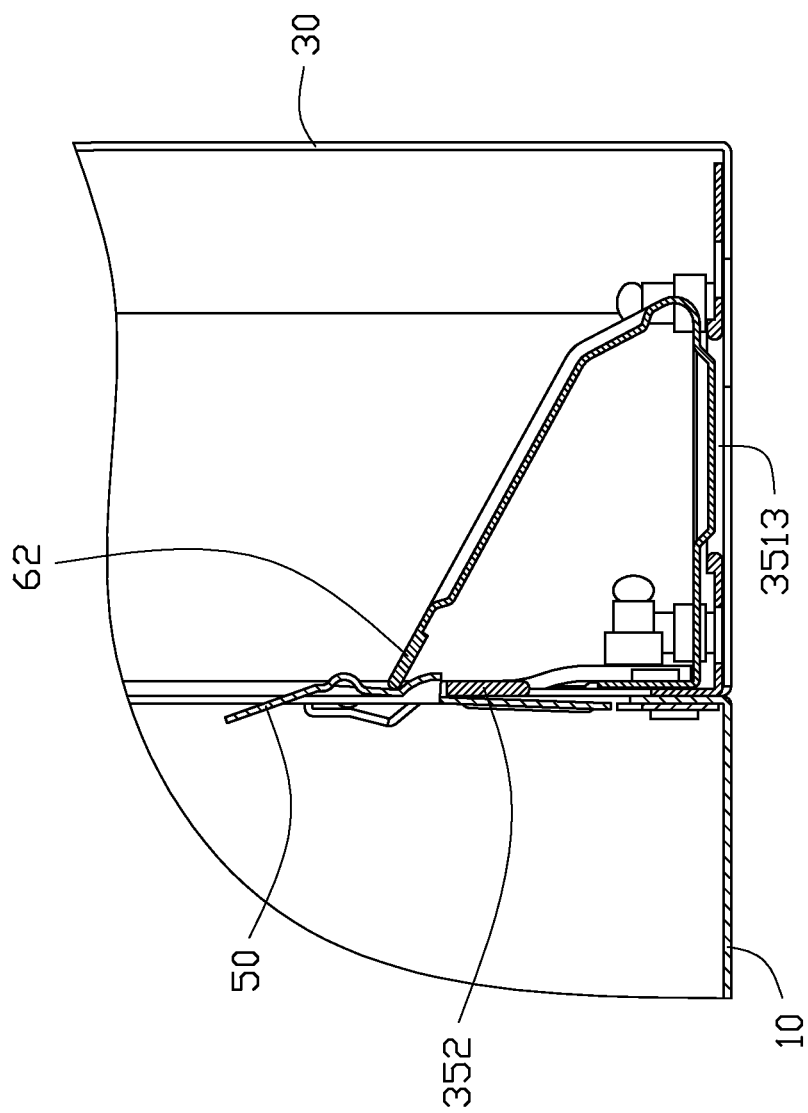
FIG. 4 is a partial, assembled view of a chassis, the bezel assembly, a locking clip and an unlocking clip.
Figure 5:
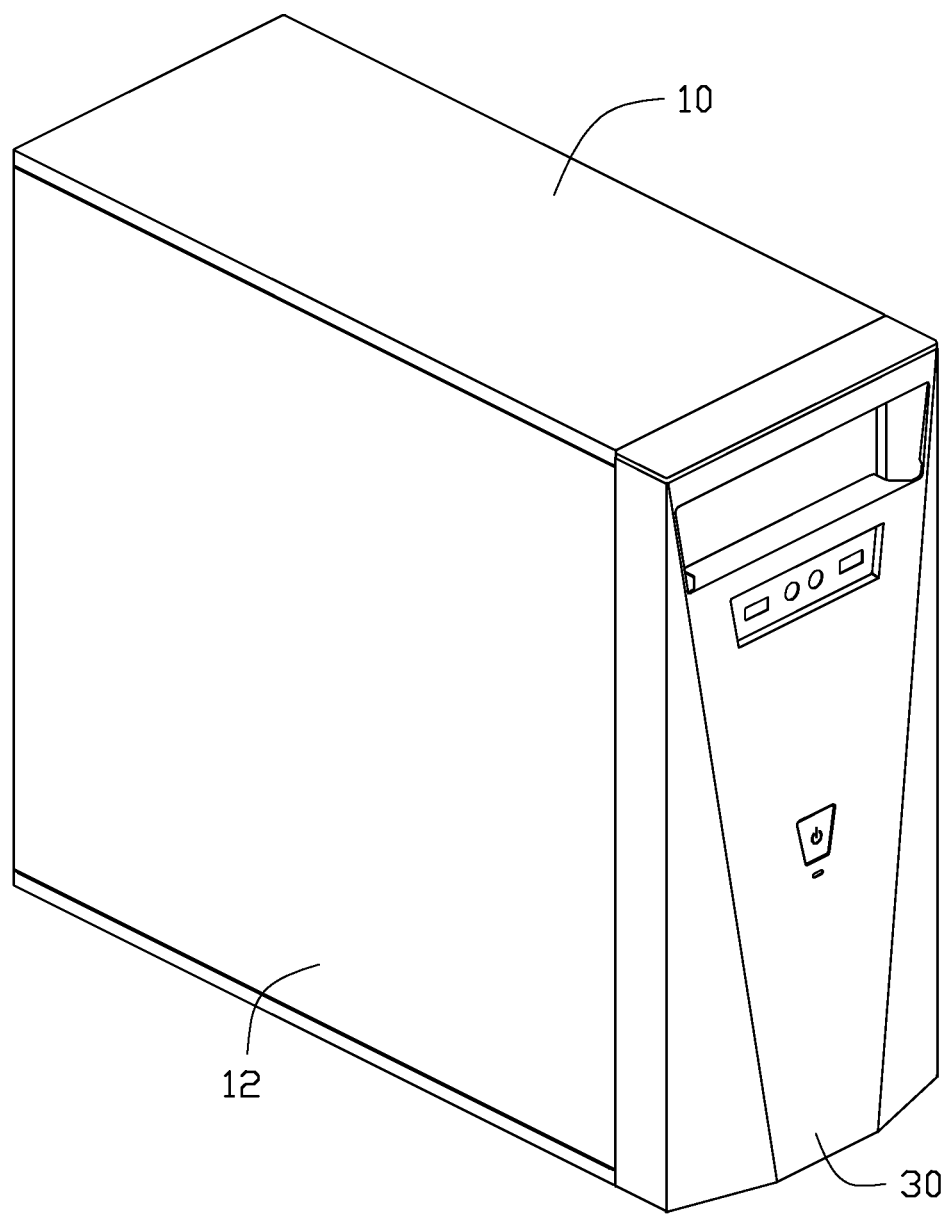
FIG. 5 is an assembled view of FIG. 1.

Referring to FIG. 4 and FIG. 5, during assembling the bezel assembly, the bottom cover 35 is fixed to the bottom portion of the bezel 30 and the side wall 352 is placed substantially parallel to the inner edges 314. The unlocking clip 60 is fixed to the inside of the bottom cover 35 with the unlocking clip 60 accessible through the operating hole 3513 of the bottom wall 351 from outside of the bezel assembly.

During the assembling of the enclosure, the locking clip 50 is mounted to the bottom flange 17 of the chassis 11 with the base 51 placed substantially parallel to the side flanges 15 at an original state. The bezel assembly moves down from top side of the chassis 11 to cover the opening of the chassis 11. The finger 3142 abuts against the side flanges 15, and the latches 3147 are engaged with the side flanges 15 through the corresponding T-shaped retaining holes 152. The tongues 312 are received in the bridges 162 of the chassis 11. The bottom cover 35 resists against the locking clip 50 when the bottom cover 35 reaches the locking clip 50. The locking clip 50 is elastically rotated about the bottom flange 17. The locking clip 50 elastically distorts and blocks a top edge of the side wall 352 of the bottom cover 35 from moving upward, when the bezel assembly covers the opening completely with the protrusion 512. The side panel 12 is slidably mounted to the chassis 11, and the mounting tab 122 is engaged with the bezel 30 through the mounting hole 3145.

During detachment of the enclosure, the side panel 12 is removed from the chassis 11. The unlocking clip 60 is pressed through the operating hole 3513 along a first direction, the unlocking clip 60 rotates, and the free end portion 62 pushes the locking clip 50 to rotate towards a second direction. The second direction is perpendicular to the first direction. The protrusion 512 is disengaged from the bottom cover 35 and the bezel assembly is removed from the chassis 11.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   an enclosure body, and an opening defined in the enclosure body;
   a bezel assembly mounted to the enclosure body and covering the opening;
   a resilient locking clip attached to the enclosure body; and an unlocking clip attached to the bezel assembly and being operable along a first direction; wherein the unlocking clip is capable of being rotated from a first position, where the resilient locking clip blocks the bezel assembly from moving along the first direction, to a second position, where the resilient locking clip is pressed by the unlocking clip to move away from the bezel assembly and is disengaged from the bezel assembly.

2. The electronic device enclosure of claim 1, wherein the unlocking clip is V-shaped, a first end of the unlocking clip is mounted to the bezel assembly, and a second end of the unlocking clip abuts the resilient locking clip in the second position.

3. The electronic device enclosure of claim 1, wherein the unlocking clip is located inside the bezel assembly, the bezel assembly comprises a bezel and a bottom cover fixed to the bezel, an operating hole is defined in the bottom cover to allow the unlocking clip to be accessible from outside of the bezel assembly.

4. The electronic device enclosure of claim 1, wherein a protrusion is located on the resilient locking clip, the protrusion is substantially semi-spherical.

5. The electronic device enclosure of claim 1, wherein the resilient locking clip comprises a base plate and a bevel that is oblique to the base plate.

6. The electronic device enclosure of claim 1, wherein the bezel assembly comprises metal.

7. The electronic device enclosure of claim 1, wherein the enclosure body comprises a side flange, at least one T-shaped retaining slot is defined in the side flange, and at least one latch is located in the bezel assembly corresponding to the at least one T-shaped retaining slot.

8. The electronic device enclosure of claim 1, wherein at least one bridge is located on the enclosure body, and at least one tongue extends from the bezel assembly along a second direction, and the second direction is opposite to the first direction.

9. The electronic device enclosure of claim 1, wherein the enclosure body further comprises a side panel, a mounting tab is located on the side panel, a mounting hole is defined in the bezel assembly, and the mounting tab is received in the mounting hole in the first position.

10. An electronic device enclosure comprising:
   an enclosure body, and the enclosure body comprising a chassis, an opening defined in the chassis;
   a bezel assembly mounted to the enclosure body and covering the opening;
   a resilient locking clip attached to the enclosure body, a protrusion located on the resilient locking clip; and
   an unlocking clip attached to the bezel assembly and being operable along a first direction, the unlocking clip being substantially V-shaped, a first end of the unlocking clip being mounted to the bezel assembly, and a second end of the unlocking clip configured to abut the resilient locking clip;
   wherein the unlocking clip is capable of being rotated from a first position, where the resilient locking clip blocks the bezel assembly from moving along the first direction, to a second position, where the unlocking clip presses the resilient locking clip, and the resilient locking clip is disengaged from the bezel.

11. The electronic device enclosure of claim 10, wherein the unlocking clip is located inside the bezel assembly, the bezel assembly comprises a bezel and a bottom cover fixed to the bezel, and an operating hole is defined in the bottom cover to allow the unlocking clip to be accessible from outside of the bezel assembly.

12. The electronic device enclosure of claim 10, wherein a protrusion is located on the resilient locking clip to engage with the bezel, and the protrusion is substantially semi-spherical.

13. The electronic device enclosure of claim 10, wherein the resilient locking clip comprises a base plate and a bevel oblique to the base plate.

14. The electronic device enclosure of claim 10, wherein the bezel assembly comprises metal.

15. The electronic device enclosure of claim 10, wherein the enclosure body comprises a side flange, at least one T-shaped retaining slot is defined in the side flange, and at least one latch is located in the bezel assembly corresponding to the at least one T-shaped retaining slot.

16. The electronic device enclosure of claim 10, wherein at least one bridge is located on the enclosure body, and at least one tongue extends from the bezel assembly along a second direction, wherein the second direction is opposite to the first direction.

17. The electronic device enclosure of claim 10, wherein the enclosure body further comprises a side panel, a mounting tab is located on the side panel, a mounting hole is defined in the bezel assembly for receiving the mounting tab, and the mounting tab is received in the mounting hole in the first position.

18. The electronic device enclosure of claim 10, wherein the resilient locking clip is configured to be biased by the unlocking clip to move away from the bezel assembly.

\* \* \* \* \*